United States Patent
Edwards et al.

(10) Patent No.: US 10,843,815 B2
(45) Date of Patent: Nov. 24, 2020

(54) AIRCRAFT WING LIGHTING

(71) Applicant: AIRBUS OPERATIONS LIMITED, Bristol (GB)

(72) Inventors: Henry Edwards, Bristol (GB); Christopher Lynas, Bristol (GB)

(73) Assignee: Airbus Operations Limited, Bristol (GB)

(*) Notice: Subject to any disclaimer, the term of this patent is extended or adjusted under 35 U.S.C. 154(b) by 0 days.

(21) Appl. No.: 16/366,208

(22) Filed: Mar. 27, 2019

(65) Prior Publication Data
US 2019/0300201 A1    Oct. 3, 2019

(30) Foreign Application Priority Data

Mar. 29, 2018 (GB) .................................. 1805161.5

(51) Int. Cl.
*B64D 47/06* (2006.01)
*B64C 23/06* (2006.01)

(52) U.S. Cl.
CPC ............ *B64D 47/06* (2013.01); *B64C 23/072* (2017.05); *B64D 2203/00* (2013.01)

(58) Field of Classification Search
CPC .... B64C 23/072; B64D 2203/00; B64D 47/06
See application file for complete search history.

(56) References Cited

U.S. PATENT DOCUMENTS

| 2,375,075 | A | * | 5/1945 | Carruth | ............... | B64D 47/06 |
| | | | | | | 362/470 |
| 5,057,833 | A | * | 10/1991 | Carlson | ............... | B64D 47/06 |
| | | | | | | 340/961 |
| 5,690,408 | A | | 11/1997 | de la Peña et al. | | |
| 8,506,138 | B2 | * | 8/2013 | Edmond | ............... | B64D 47/06 |
| | | | | | | 362/470 |
| 8,651,431 | B1 | * | 2/2014 | White | ............... | B64C 23/076 |
| | | | | | | 244/218 |
| 9,090,341 | B2 | * | 7/2015 | Edmond | ............... | B64D 47/02 |
| 9,469,415 | B1 | * | 10/2016 | Harvey | ............... | B64D 47/04 |
| 9,889,948 | B2 | * | 2/2018 | Hessling von Heimendahl | .......... | |
| | | | | | | B64D 47/02 |

(Continued)

FOREIGN PATENT DOCUMENTS

WO    2013/181402    12/2013

OTHER PUBLICATIONS

Combined Search and Examination Report for GB1805161.5, dated Sep. 20, 2018, 5 pages.

*Primary Examiner* — Tsion Tumebo
(74) *Attorney, Agent, or Firm* — Nixon & Vanderhye P.C.

(57) ABSTRACT

An aircraft wing assembly including a wing having a main body 5 and a movable portion 6, so that the wing may be folded when taxiing. A lighting system is provided with a light source 9; a light emitter 11 arranged on one of the main body and the movable portion, and a light guide 10 arranged to transmit light from the light source along a path between the main body and the movable portion to the light emitter. The provision of a light guide between the light source and the emitter allows for light to be transmitted to the emitter across the joint 8 between the wing main body and the movable portion. Thus, lighting on the wing may be provided without the need to provide electrical wiring across the joint. A single light source 9 may be employed to illuminate multiple light emitters 11, 13 on the wing.

20 Claims, 6 Drawing Sheets

(56) References Cited

U.S. PATENT DOCUMENTS

| | | | |
|---|---|---|---|
| 2005/0093718 A1* | 5/2005 | Martin | B64D 47/06 340/981 |
| 2009/0161376 A1* | 6/2009 | Giffen | B64D 47/06 362/470 |
| 2016/0096635 A1* | 4/2016 | Hessling von Heimendahl | B64D 47/02 362/470 |

* cited by examiner

AIRCRAFT WING LIGHTING

RELATED APPLICATION

This application claims priority to United Kingdom patent application GB 1805161.5 filed Mar. 29, 2018, which is incorporated by reference in its entirety.

FIELD OF TECHNOLOGY

This invention relates to an aircraft wing and, in particular, a lighting system for such a wing. The invention is particularly suitable for aircraft having moving wing parts, such as foldable wing tips.

BACKGROUND

Developments in commercial aircraft have resulted in larger aircraft with higher performance efficiency, for which it is desirable to have correspondingly large wing spans. However, the maximum aircraft wing span is effectively limited by airport operating rules which govern various clearances required when maneuvering around the airport. To alleviate this problem, it is known to provide aircraft with wings having a foldable portion. In the ground configuration, the foldable portion is moved by, for example, rotation relative to the main body of the wing, such that the overall span of the wing is reduced. Thus, the aircraft can comply with airport operating rules, yet benefit from the larger span in flight. Foldable wings may also be provided on military aircraft to allow aircraft to be stored where space is at a premium, such as on aircraft carriers.

Aircraft are required to have lighting arrangements on the wings for navigation purposes and to provide visibility and identification. It is desirable to provide lighting at the aircraft's wing tips, particularly as aircraft taxi close to one another in the airport near to passenger boarding gates. In the case of an aircraft with a folding wing, it is desirable to provide additional lighting on the main body of the wing, at the extremity of the folded wing configuration.

A problem which may be encountered with lighting systems on aircraft having foldable wings is that electrical wiring needs to be provided from the aircraft power system to the movable wing portion across the joint where the wing is arranged to fold. In service, such wings may move from retracted to deployed positions several times a day, leading to wear and tear of the wiring and its associated connectors or contacts such that the lighting system needs to be maintained frequently.

BRIEF SUMMARY OF THE TECHNOLOGY

The invention provides an aircraft wing assembly comprising a wing having a main body and a movable portion and further comprising a lighting system comprising a light source; a light emitter arranged on one of the main body and the movable portion; and further comprising a light guide arranged to transmit light from the light source along a path between the main body and the movable portion to the light emitter.

The provision of a light guide providing a path between the light source and the emitter allows for light to be transmitted to the emitter across the joint between the wing main body and the movable portion. Thus, lighting on the wing may be provided without the need to provide electrical wiring across the joint.

Preferably, the emitter comprises a first light emitter, and the lighting system further comprises a second light emitter arranged on the other of the main body and movable portion. This arrangement provides additional lighting on the wing without the need to provide and energize more than one light source.

The movable portion is preferably arranged to move between a folded position and a deployed position. The lighting system may be arranged so that one of the first and second emitters is arranged to emit light in the deployed position, and the other of the first and second emitters is arranged to emit light in the folded position. Thus, lighting is provided to indicate the extremity of wing when in both positions.

Alternatively, one of the emitters may be arranged to emit light in both folded and deployed positions, in dependence on the requirements of the aircraft.

Preferably, the light guide is arranged on the movable portion so as to transmit light to the emitter on the movable portion when the movable portion is in the deployed position. This arrangement eliminates the need for control circuitry of the lighting system, as light is automatically transmitted to the emitter on the movable portion when the wing is in the deployed configuration. When the wing is folded, the light guide is moved away so that the emitter on the movable portion is not illuminated.

A light collector may be provided and arranged to direct light into the light guide from the light source, thereby ensuring that as much light as possible reaches the (or each) emitter.

The light guide may comprise a light pipe, an optical fibre or a bundle of fibres, or a combination of light pipes and optical fibres. Thus, the light path between the source and the (or each) emitter may be customised to fit around other components on the aircraft.

The emitter arrangement may include windows, lenses (including Fresnel lenses), reflectors, or any combination of these elements.

If the light guide comprises a bundle of optical fibres, it may be arranged to form branches, each branch being associated with an emitter. In this arrangement, light may be transmitted from the source to respective emitters. This arrangement is particularly suitable for providing light along the leading edge of the wing.

The light source may comprise one or several LEDs, an incandescent bulb, a strobe light or any combination of these components as desired.

The invention further comprises a method of providing light on the wing of an aircraft, the wing having a main body and a movable portion. The method comprises the steps of: energizing a light source; and transmitting light from the source along a light guide to a light emitter arranged on one of the main body and the movable portion, the light guide being arranged to transmit light along a path between the main body and the movable portion to the light emitter.

The invention further comprises an aircraft comprising a fuselage and a wing having a main body and a movable portion and further comprising a lighting system comprising a light source. A light emitter is arranged on one of the main body and the movable portion, and there is provided a light guide arranged to transmit light from the light source along a path between the main body and the movable portion to the light emitter.

BRIEF DESCRIPTION OF THE DRAWINGS

The invention will now be described, by way of example, with reference to the accompanying drawings in which.

DETAILED DESCRIPTION OF EMBODIMENTS OF THE TECHNOLOGY

Figure 1A:
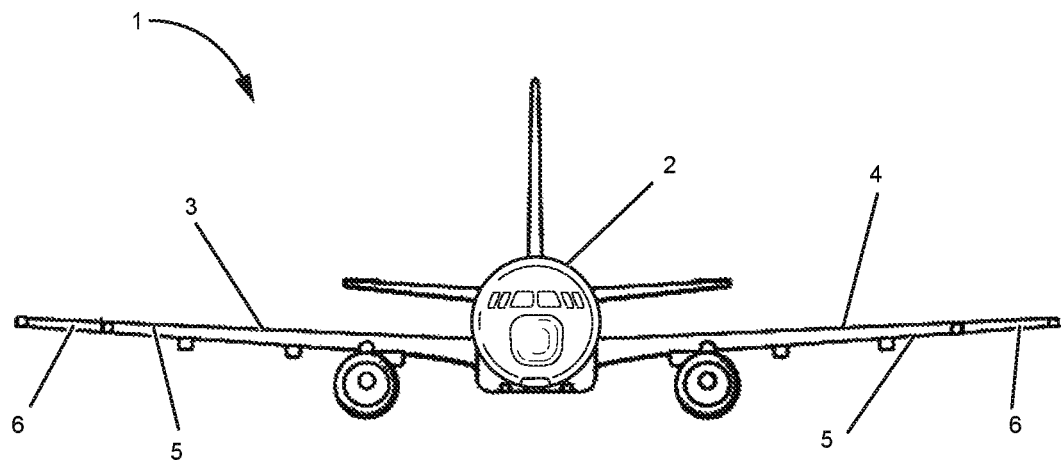
FIG. 1a is a front view of an aircraft incorporating a wing constructed according to the invention in a first position.
Figure 1B:
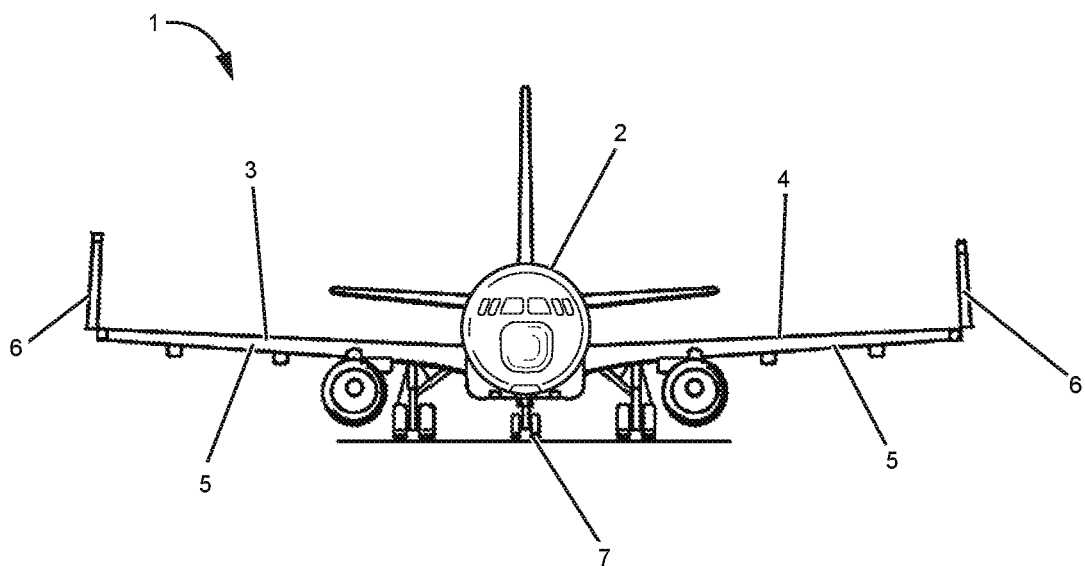
FIG. 1b is a front view of the aircraft of FIG. 1a with the wing in a second position.

Like reference numerals refer to like parts throughout the specification. With reference to FIGS. 1a and 1b, a passenger aircraft is shown and indicated generally by the reference numeral 1. The aircraft 1 comprises a fuselage 2 for holding passengers and cargo, a right (starboard) wing 3 and a left (port) wing 4. Each of the wings 3, 4 comprises a main body 5 and a movable portion 6 at the distal end of the wing. The aircraft 1 is shown in an in-flight configuration in FIG. 1a. In FIG. 1b, the aircraft 1 has its landing gear 7 lowered and is shown in an on-ground configuration, as it would employ when taxiing at an airport. One of the wings 3 is shown schematically from above in FIGS. 2a and 2b, and part of the wing is shown schematically in FIGS. 3a and 3b. These drawings are not intended to be accurate representations of the relative positions of the wing.

Figure 2A:
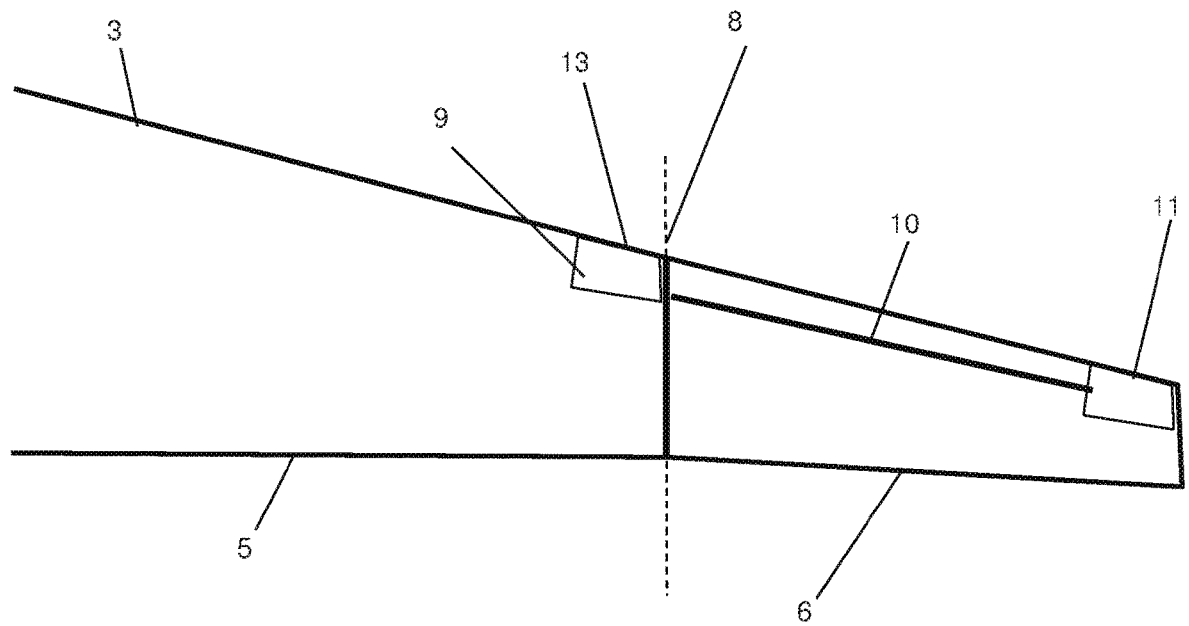
FIG. 2a is a schematic sectional plan view of an aircraft wing constructed according to a first embodiment of the invention in the first position.
Figure 2B:
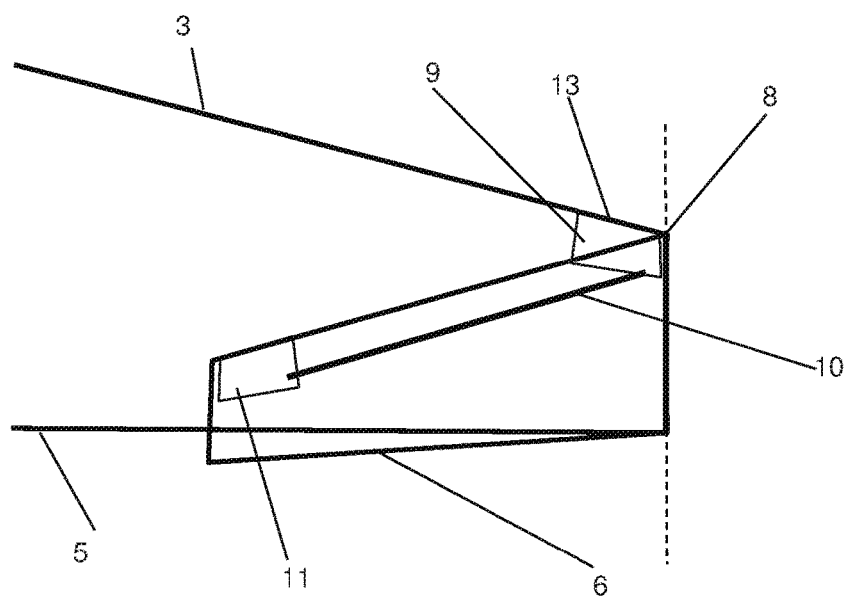
FIG. 2b is a schematic sectional plan view of the wing of FIG. 2a in the second position.

With reference to FIGS. 1 and 2, the main body 5 of the wing 3 extends outwardly from the side of the fuselage 2, with the movable portion 6 extending from the main body to the tip of the wing. The line 8 denotes the joint between the main body 5 of the wing and the movable portion 6. The movable portion 6 may be rotatably connected to the main body 5 of the wing 3 by means of a hinge assembly (not shown) which may be electro-mechanically or hydraulically actuated. A control system is provided on the aircraft 1 in order to rotate the hinge assembly and thus control motion of the movable portion 6 between a folded or retracted position (FIGS. 1b, 2b), and a deployed position (FIGS. 1a, 2a). The aircraft wings 3, 4 must be in the deployed position for flight. When the aircraft 1 is taxiing at ground level, the pilot may selectively activate the control system to cause the movable portions 6 to rotate about their respective hinges into the retracted position so that the aircraft 1 may move into more congested areas of the airport without fear of the wings 3, 4 colliding with other craft, passenger gates, etc.

The means by which the wings move between deployed and folded states does not form the basis of this patent application.

The wing 3 includes a lighting system comprising a light source 9, a light guide 10 and a light emitter 11. In this embodiment, the light source 9 is mounted on the interior of the main body 5 of the wing 3 and is energized by the aircraft power system (not shown). The light source 9 may comprise an LED, a plurality of LEDs, an incandescent bulb, a strobe light, fluorescent light, discharge lamp or any form of light source suitable for incorporating into an aircraft.

Figure 3A:
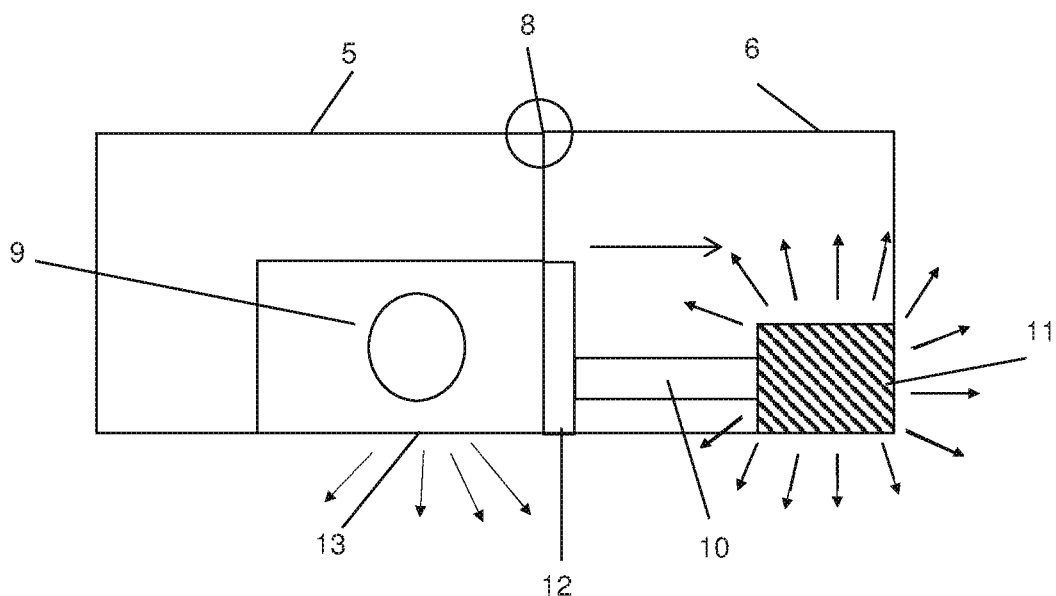
FIG. 3a is a schematic sectional side view of the lighting system of the wing of FIGS. 1 and 2 in a first position.

With reference to FIGS. 2 to 3, the light source 9 is arranged close to the joint 8 between the main body 5 and the movable portion 6. On the other side of the joint 8, on the interior of the movable portion 6, the light guide 10 is provided in the form of a light pipe. In this embodiment, the light pipe 10 comprises a cylinder of transparent plastics material, for example acrylic, in which light may be transmitted along its interior by means of total internal reflection. Light pipes are capable of redirecting light output to a desired location with minimal loss of intensity. When the movable portion 6 of the wing 3 is in the deployed position (FIGS. 1a, 2a, 3a), the light pipe 10 is arranged to be in alignment with the light source 9 so that light emitted by the source is transmitted via the light pipe 10 to the light emitter 11, which is incorporated in the tip 7 of the wing. The emitter 11 in this example is in the form of a window, which may be arranged to conform to the exterior surface of the tip of the wing.

Thus, when the aircraft wing is in the deployed position, light is transmitted from the source 9 to the emitter 11 on the tip of the wing without the need to provide electrical connections across the joint 8 between the moving and stationary parts of the wing. The emitter 11 acts as a beacon indicating the extremity of the deployed wing.

A light collector 12 is provided in order to collect light from the light source 9 and direct it through the light pipe 10. The collector 12 improves the efficiency of the system, as it concentrates the diverging light from the source 9 into the light pipe 10 and so increases the luminance at the emitter 11.

Figure 3B:
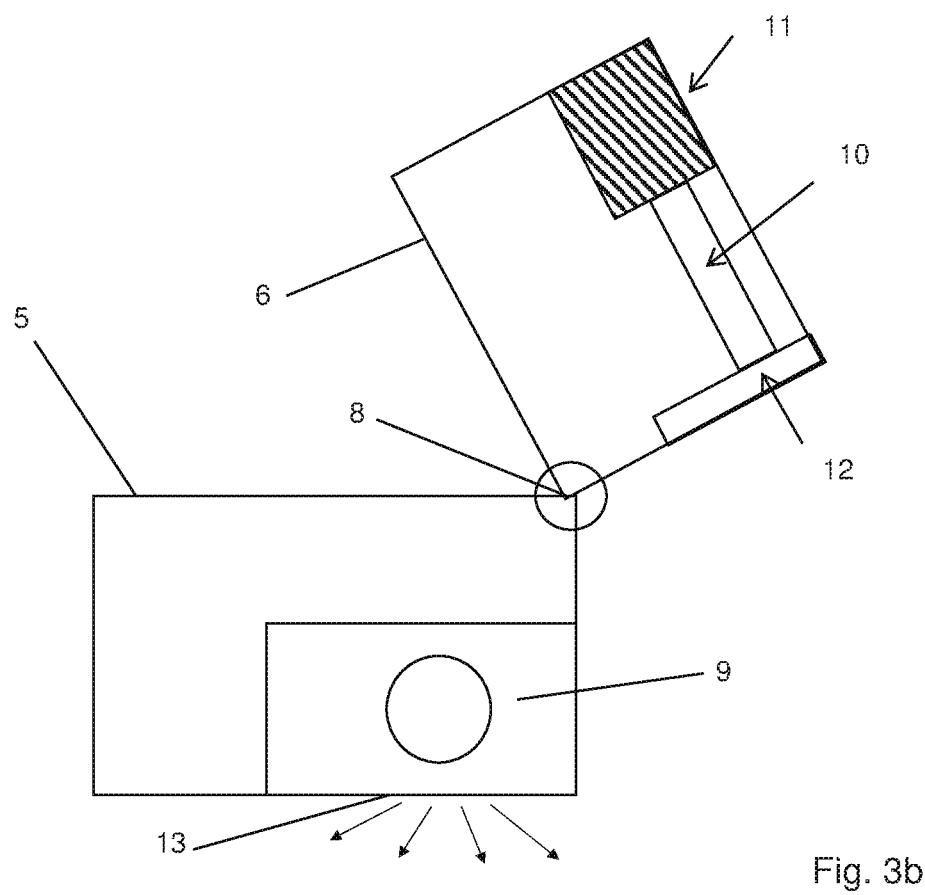
FIG. 3b is a schematic sectional side view of the lighting system of FIG. 3a when the wing is in the second position.

When the aircraft 1 is taxiing at ground level, the control system is activated to retract the movable portion 6 of the wing into the folded configuration shown in FIGS. 1b, 2b and 3b. In this position, the light collector 12 and light pipe 10 are brought out of engagement with the light source 9, so that the window 11 is not illuminated. In this arrangement, the light source 9 is mounted adjacent a window 13 on the exterior surface of the main body 5 of the wing 3, which also acts as an emitter of light. Hence, in the folded position, the window 13 becomes a second beacon indicating the extremity of the folded wing 3. The window 13 conforms to the profile of the wing 3, so that the aerodynamic efficiency of the aircraft 1 is not compromised.

In this arrangement of the invention, two light emitters 11, 13 are energized from a single light source 9. Thus, an advantage of the invention is that additional lighting may be provided on the main body of the wing and/or the movable portion without having to install and energize multiple light sources. Furthermore, the emitter 11 is illuminated and de-energized automatically in dependence on the position of the movable wing portion 6, so that there is no need to provide control circuitry or a signal processor.

In this embodiment, the window 13 emits light when the wing is in both retracted and deployed positions. If it is desirable to have the window 13 emitting light only when the wing is folded, a shutter (not shown) may be provided and arranged to move in dependence on the rotation of the movable wing portion 6, so as to prohibit light from being emitted from the window 13 when the wing is deployed. The shutter may be arranged within the main body 5 of the wing, between the light source 9 and the window 13. Alternatively, the shutter may form an integral part of the exterior surface of the movable portion 6 of the wing 3, arranged to cover the window 13 when the wing is in the deployed position.

Figure 4:
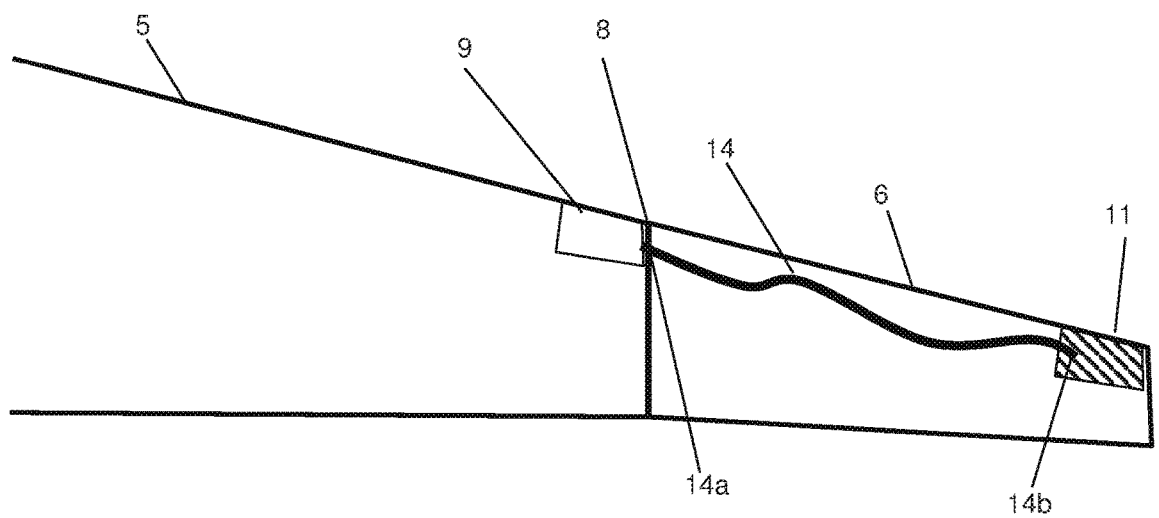
FIG. 4 is a schematic sectional plan view of a wing constructed according to a second embodiment of the invention in the first position.

In the embodiment shown in FIG. 4, the rigid light guide 10 is replaced by a bundle of flexible optical fibres 14 located in the movable portion 6 of the wing 3, with all other components being the same as in the embodiment of FIGS. 1-5. The advantage of optical fibres over a light pipe is their flexibility. The provision of a light guide 14 comprising a bundle of optical fibres allows for easy integration of the lighting system of the invention around existing components in the wing 3. The fibres of the bundle have a common input end 14a arranged to receive light from the light source 9, either directly or via a collector. Light is then transmitted along the respective fibres to a common output end 14b arranged adjacent a window or other emitter 11 arranged to emit light externally. When the wing is in the folded configuration, the input end 14a of the bundle of fibres no longer receives light from the source and so the emitter 11 is not illuminated.

Figure 5:
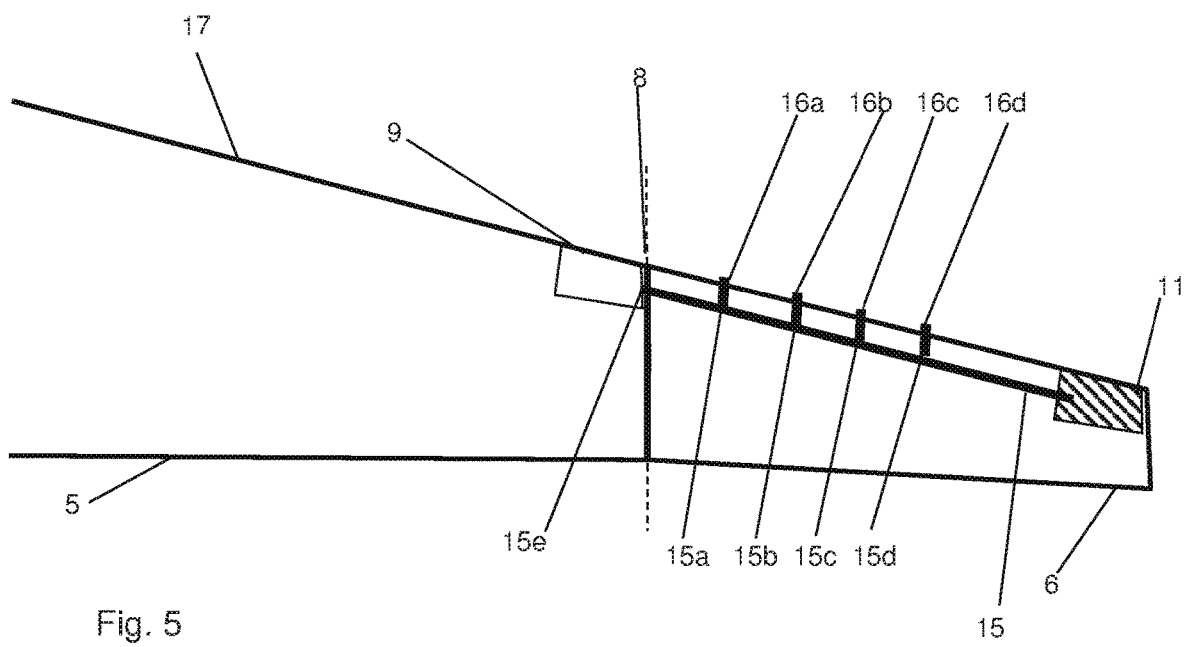
FIG. 5 is a schematic sectional plan view of a wing constructed according to a third embodiment of the invention in the first position.

An alternative embodiment is shown in FIG. 5, having a light guide comprising a bundle of optical fibres 15 arranged in the movable portion 6 of the wing, as before. However, the fibres of the light guide 15 are arranged to form a plurality of branches 15a-15d. The fibres 15 have a common input end 15e arranged to receive light from the light source 9, either directly or via a collector. Light is then transmitted down the respective fibres and is divided among the branches 15a-15d to respective emitters in the form of windows. The first of the emitters is the window 11 at the distal end portion of the light guide, adjacent the tip of the wing 3 as before. The other emitters 16a-16d are arranged along the leading edge 17 of the wing 3, so that light is emitted outwardly along the wing. The light thus emitted may be used to illuminate the area in front of the wings or to identify the aircraft 1. The bundle of fibres 15 may be divided evenly so as to produce substantially the same intensity of light output at each emitter 11, 16a-16d. Alternatively, the fibres may be divided up to produce differing respective outputs at the emitters, for example a brighter light at the emitter 11 than at the emitters 16a-16d. The emitters 11, 16a-16d may incorporate filters so as to emit light of different respective colours, in accordance with the livery or branding of the aircraft 1. In this example, the emitters 16a-16d are arranged along the leading edge 17 of the wing 3; however, it will be apparent to the skilled person that the emitters could be arranged on another part of the wing structure. For example, the lighting system could be arranged to emit light around the nacelle of the aircraft or along the trailing edge of the wing.

As a further alternative, the branches 15a-15d of the light guide may be arranged to emit light into the interior of the wing 3, 4. In this arrangement, the light thus emitted may be used to inspect the interior of the wing and the components installed therein. Light may be provided for areas that are conventionally difficult to access and inspect. Of course, the optical fibres 15 may be arranged so that light is emitted from the wing both outwardly and inwardly, or a shutter arrangement may be provided so that light may be selectively emitted either outwardly from or into the wing. As a further alternative, the light guide may be arranged to be selectively rotatable so that the output ends of the fibres 15a-15d face outwardly along the leading edge of the wing, or else inwardly towards the interior of the wing as desired.

Figure 6:
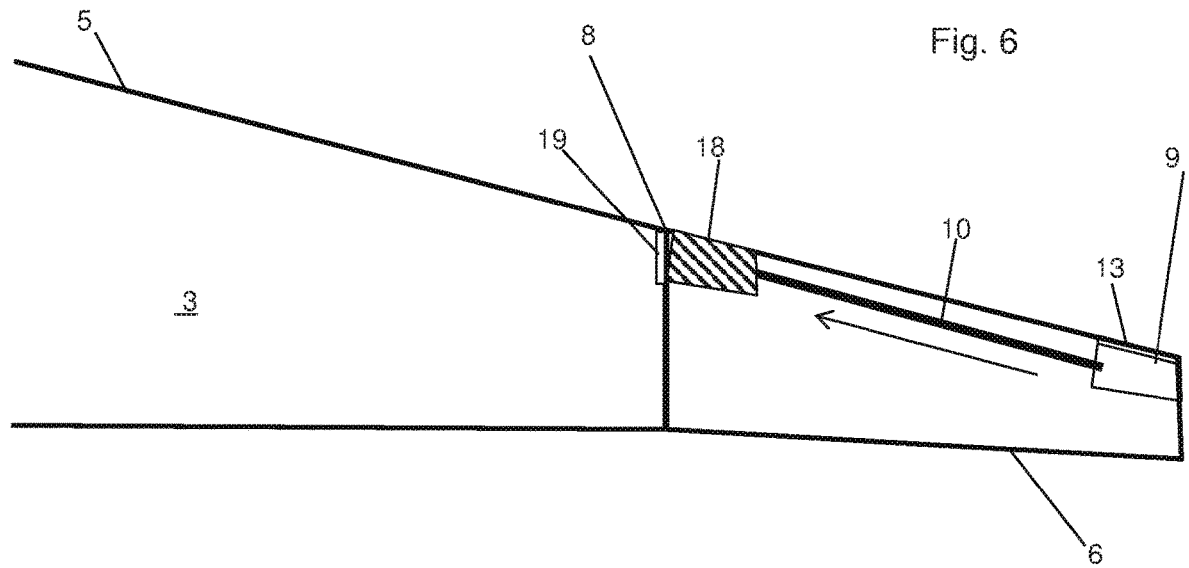
FIG. 6 is a schematic sectional plan view of a wing constructed according to a fourth embodiment of the invention in the first position.
Figure 7:
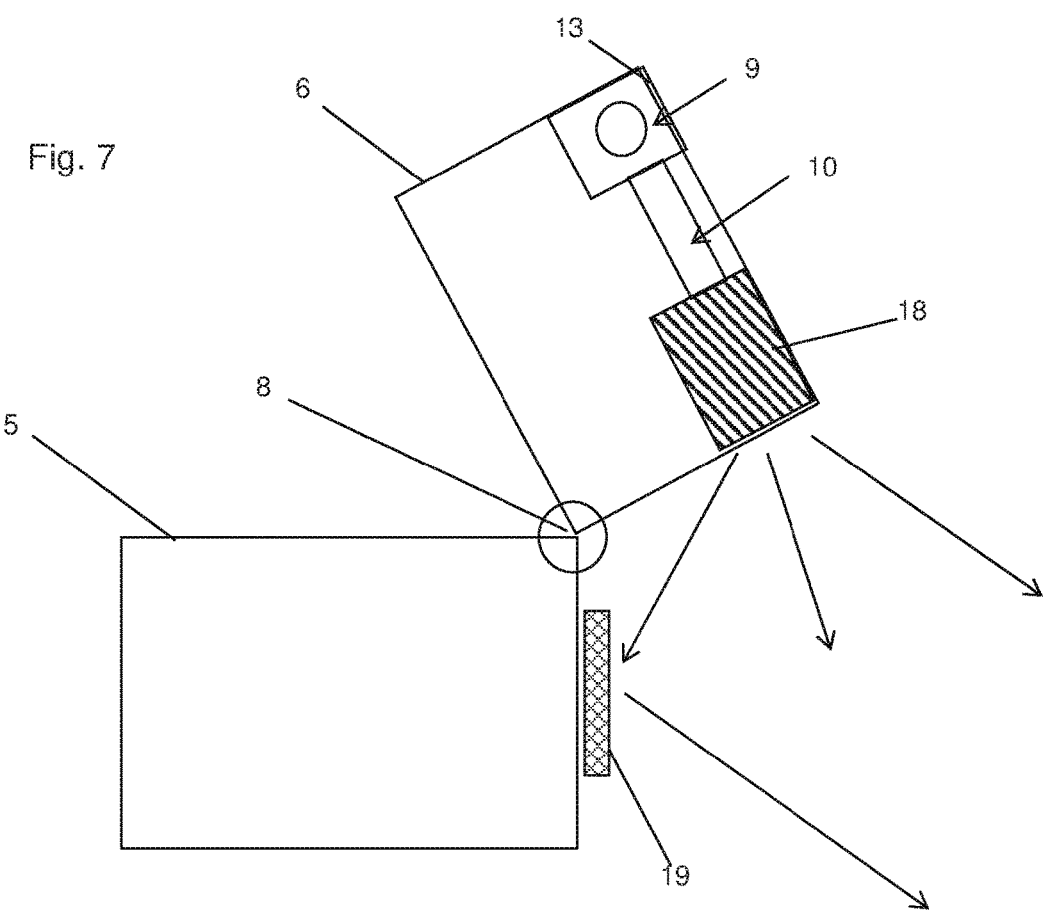
FIG. 7 is a schematic sectional side view of part of the wing of FIG. 6 in the second position.

Another alternative embodiment is shown in FIGS. 6 and 7. In this arrangement, the light source 9 is mounted in the interior of the movable portion 6 of the wing 3, adjacent the tip of the wing. A window 13 is adjacent the light source 9 and is arranged to emit light from the source at the tip of the wing 3 in order to indicate the extremity of the wing when in the deployed position of FIG. 6. A light guide in the form of light pipe 10 is provided and arranged to transmit light from the light source 9 to an emitter 18, also on the movable portion 6 of the wing. The emitter 18 arranged to direct light towards another emitter in the form of a reflector 19. The reflector 19 is mounted on the main body 5 of the wing 3, adjacent the joint 8. When the wing is in the deployed position, light is not emitted from the wing at the emitters 18, 19.

The wing 3 is shown in the folded position in FIG. 7. In this configuration, the emitter 18 is arranged to direct light at the reflector 19, which reflects light outwardly of the wing. Thus, light is emitted at the joint 8 by both the emitter 18 and the reflector 19, so that light is visible at the extremity of the folded wing through a wide range of locations.

Figure 8:
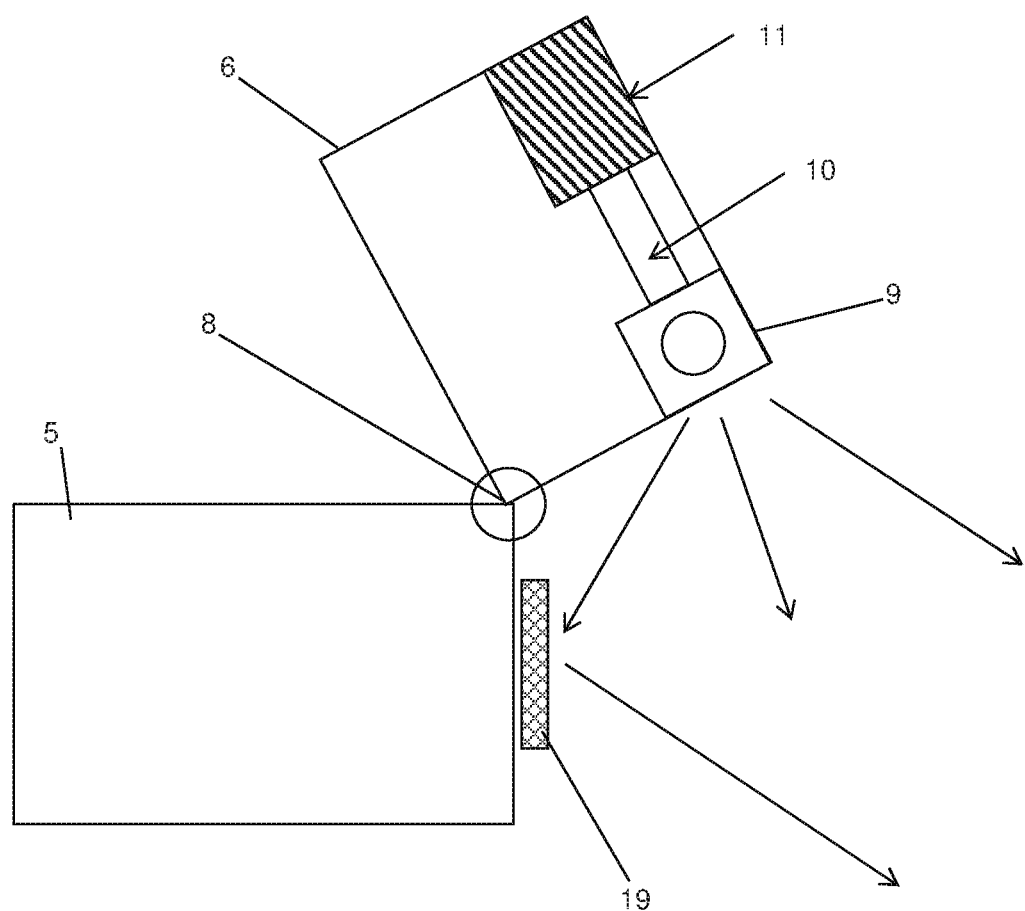
FIG. 8 is a schematic sectional side view of part of a wing constructed in the second position according to a fifth embodiment of the invention.

The embodiment shown in FIG. 8 is similar to that shown in FIGS. 6 and 7, except that the light source 9 is arranged on the movable wing portion 6 close to the joint 8, and is arranged to transmit light to an emitter in the form of a window 11 on the tip of the wing when the wing 3 is in the deployed configuration. When the wing 3 is in the folded configuration of FIG. 8, light is emitted directly from the light source 9 onto a reflector 19, which redirects light outwardly of the wing. In this configuration, the emitter 11 at the wing tip may continue to emit light or else is stopped by means of a shutter over the emitter. Alternatively, the light source 9 may be controlled to emit light towards the emitter 11 or towards the reflector 19, in dependence on the position of the moveable portion 6 of the wing 3.

Further variations may be made without departing from the scope of the invention. For example, emitters in the form of windows or reflectors have been disclosed, but other emitters may be substituted and arranged to emit light by direct transmission, refraction or reflection. Lenses and prisms are suitable forms of emitter. A Fresnel lens may be employed, which emits light by refraction, or by a combination of refraction and reflection. Filters may be provided on each emitter in order to modify the spectrum of emitted light.

The invention has been described with reference to the light guide being either a light pipe or a system of optical fibres; a combination of these types of light guides may be employed in dependence on the requirements of the aircraft. The light pipe need not be cylindrical and need not be solely plastic.

As a further alternative, the light source 9 need not be mounted on the wing 3, 4 itself. The light source 9 may be arranged on another part of the aircraft, such as in the fuselage 2, with light guides arranged to transmit light to the wing for onward transmission by the light guide and emitter combination of the present invention. The light source 9 may also be located on the nacelle, empennage or landing gear of the aircraft.

The light source need not be a single source of light. A plurality of light sources may be employed and arranged to transmit light selectively to the light guide. Alternatively, a network of light sources and light guides may be provided in order to transmit light to various emitters on the aircraft across the folding wing part.

The invention claimed is:
1. An aircraft wing assembly comprising:
   a wing having a main body, a movable portion and a joint connecting the movable portion to the main body, wherein the movable portion is pivotable between a folded position and a deployed position;
   a lighting system comprising:
      a light source on the main body or the moveable portion;
      a light emitter on the other of the movable portion or the main body, wherein the light emitter projects the light from the wing,
      a light guide on the movable portion, wherein the light guide includes a first end aligned with the light source and configured to receive the light from the light source, and
      the light guide is arranged to transmit the light received from the light source along a path through the movable portion to the light emitter, wherein a second end of the light guide directs the light to the light emitter,
      wherein one of the first or second ends of the light guide faces the joint and is configured to either receive the light projected across the joint by the light source on the main body while the moveable portion is in the deployed position or project the light across the joint to the emitter on the main body while the moveable portion is in the folded position.
2. The aircraft wing assembly as claimed in claim 1, in which the emitter comprises a first light emitter on the moveable portion, the lighting system further comprising a second light emitter arranged on the main body, wherein the first and second light emitters project the light from the wing while the moveable portion is in the folded position.
3. The aircraft wing assembly as claimed claim 1, further comprising a light collector on the moveable portion and proximate the joint, wherein the light collector is arranged to direct the light from the light source into the light guide.
4. The aircraft wing assembly as claimed in claim 1, in which the light guide includes a light pipe.
5. The aircraft wing assembly as claimed in claim 1, in which the light guide includes at least one optical fiber.
6. The aircraft wing assembly as claimed in claim 1, in which the emitter comprises a window forming a portion of an outer surface of the moveable portion.
7. The aircraft wing assembly as claimed in claim 1, in which the emitter comprises a light reflector oriented to reflect the light from the light source and transmitted to the emitter via the light guide.
8. The aircraft wing assembly as claimed in claim 1, in which the emitter comprises a lens oriented to reflect the light from the light source and transmitted to the emitter via the light guide.
9. The aircraft wing assembly as claimed in claim 8, in which the lens is a Fresnel lens.
10. The aircraft wing assembly as claimed in claim 1, further comprising a plurality of light emitters and the light guide comprises a plurality of optical fibers arranged to transmit light from the light source to respective ones of the plurality of light emitters.
11. The aircraft wing assembly as claimed in claim 10, in which the wing has a leading edge and the light emitters are arranged on the leading edge of the wing.
12. The aircraft wing assembly as claimed in claim 1, in which the light source includes at least one LED.
13. The aircraft wing assembly as claimed in claim 1, in which the light source comprises an incandescent bulb.
14. The aircraft wing assembly as claimed in claim 1, in which the light source comprises a strobe light.
15. An aircraft including the wing assembly as claimed in claim 1.
16. An aircraft wing assembly comprising:
   a wing having a main body and a movable portion in which the movable portion moves between a folded position and a deployed position,
   a lighting system comprising:
      a light source in one of the maim body and the mobile portion;
      first light emitter arranged on the movable portion;
      a second light emitter arranged on the main body and configured to reflect light from the light source; and
      a light guide on the moveable portion arranged to transmit light from the light source to first light emitter, and
      the lighting system being arranged so that the first light emitter emits the light from the light source when the moveable portion is in the deployed position, and the second light emitter emits the light from the light source when the moveable portion is in the folded position.
17. The aircraft wing assembly as claimed in claim 16, in which one of the first and second emitters is arranged to emit light in both folded and deployed positions.
18. An aircraft wing assembly comprising:
   a wing having a main body and a movable portion, wherein the movable portion moves with respect to the main body between a folded position and a deployed position;
   a lighting system comprising:
      a light source;
      a light emitter arranged on one of the main body and the movable portion, and a light guide arranged to transmit light from the light source along a path between the main body and the movable portion to the light emitter, in which the light emitter and the light guide are arranged on the movable portion so as to transmit light to the emitter when the movable portion is in the deployed position.
19. A method of providing light on the wing of an aircraft, the wing having a main body, a movable portion pivotably attached at a joint to the main body, the method comprising the steps of:
   energizing a light source in the main body;
   transmitting light from the source towards the joint;
   receiving the light transmitted from the source at an inlet to a light guide in the moveable portion, wherein the light guide is arranged to transmit light along a path from the inlet through the movable portion to the light emitter, and
   emitting the light from the light emitter outward from the wing.
20. An aircraft comprising:
   a fuselage and a wing, wherein the wing includes a main body, a movable portion and a joint between the main body and moveable portion, wherein the moveable portion pivots about the joint between a folded position and a deployed position;
   a lighting system comprising:
      a light source in the main body and configured to project light from the main body towards the joint;
      a light emitter in the movable portion and configured to project the light from the main body outward from the wing, and a light guide in the moveable portion and arranged to transmit light from the light source to the light emitter, wherein the light guide includes an inlet facing the joint and aligned with the light source while the moveable portion is in the deployed position.

\* \* \* \* \*